（12）United States Patent
Nudurumati et al.

(10) Patent No.: US 8,861,053 B2
(45) Date of Patent: Oct. 14, 2014

(54) METHOD AND APPARATUS FOR AUTOMATED GENERATION OF A WHITE INK SEPARATION OUT OF CMYK DATA OR RGB PRINT DATA

(71) Applicant: Electronics for Imaging, Inc., Foster City, CA (US)

(72) Inventors: Srikrishna Nudurumati, Gjovik (NO); Holger Schuppan, Bottrop (DE); Ranjith Ramachandran, Bangalore (IN)

(73) Assignee: Electronics For Imaging, Inc., Fremont, CA (US)

( * ) Notice: Subject to any disclaimer, the term of this patent is extended or adjusted under 35 U.S.C. 154(b) by 50 days.

(21) Appl. No.: 13/667,491

(22) Filed: Nov. 2, 2012

(65) Prior Publication Data

US 2014/0126001 A1    May 8, 2014

(51) Int. Cl.
*G03F 3/08*     (2006.01)
*H04N 1/60*    (2006.01)
*G06K 9/00*     (2006.01)
*G06K 15/02*   (2006.01)

(52) U.S. Cl.
CPC ..................................... *G06K 15/18* (2013.01)
USPC ............ 358/520; 358/1.9; 358/518; 382/167

(58) Field of Classification Search
None
See application file for complete search history.

(56) References Cited

U.S. PATENT DOCUMENTS

| | | | | |
|---|---|---|---|---|
| 5,543,940 A | * | 8/1996 | Sherman | 358/518 |
| 5,666,436 A | * | 9/1997 | Eames | 382/167 |
| 5,982,924 A | * | 11/1999 | Power et al. | 382/162 |
| 6,025,922 A | * | 2/2000 | Marsden | 358/1.1 |
| 6,041,200 A | * | 3/2000 | Glass et al. | 399/82 |
| 7,215,343 B2 | * | 5/2007 | Edge | 345/604 |
| 7,583,421 B2 | | 9/2009 | Watanabe | |
| 7,920,297 B2 | | 4/2011 | Doggett, III et al. | |
| 2002/0135798 A1 | * | 9/2002 | Simpson et al. | 358/1.15 |
| 2002/0159098 A1 | | 10/2002 | Kleiman | |
| 2003/0007164 A1 | | 1/2003 | Lee et al. | |
| 2005/0099470 A1 | * | 5/2005 | Nishino | 347/84 |
| 2005/0206927 A1 | * | 9/2005 | Yamada | 358/1.9 |
| 2006/0158481 A1 | | 7/2006 | Spevak et al. | |
| 2006/0203270 A1 | * | 9/2006 | Shirasawa | 358/1.9 |
| 2007/0002119 A1 | | 1/2007 | Abrott | |
| 2007/0188535 A1 | | 8/2007 | Elwakil et al. | |
| 2009/0002561 A1 | * | 1/2009 | Barnhoefer et al. | 348/655 |
| 2009/0244568 A1 | * | 10/2009 | Watanabe | 358/1.9 |
| 2009/0296173 A1 | * | 12/2009 | Mestha et al. | 358/518 |
| 2010/0253957 A1 | | 10/2010 | Sano et al. | |
| 2011/0051196 A1 | | 3/2011 | Hatanaka et al. | |

(Continued)

FOREIGN PATENT DOCUMENTS

EP         0137777        1/1988

*Primary Examiner* — Madelein A Nguyen
(74) *Attorney, Agent, or Firm* — Michael A. Glenn; Perkins Coie LLP

(57) ABSTRACT

Techniques are provided that include an algorithm and a computing device using such algorithm to compute a white ink separation channel from the CMYK or RGB data from a print pipeline as an input. This input originally corresponds to print data on a media with standard whiteness, e.g. standard whiteness corresponding to a diffuser used by the Comission Internationale de l'Eclairage (CIE) 1964 media whiteness formula. In an example implementation, the white ink channel computed by the computing device using such algorithm may be printed as a pre-coat on a colorimetrically different media which does not comply with definitions and formulae of CIE's whiteness and tint.

20 Claims, 2 Drawing Sheets

(56) References Cited

U.S. PATENT DOCUMENTS

| | | | |
|---|---|---|---|
| 2011/0200346 A1* | 8/2011 | Hosier | 399/49 |
| 2012/0019579 A1* | 1/2012 | Usuda et al. | 347/12 |
| 2012/0203371 A1 | 8/2012 | Hsu | |
| 2012/0277340 A1 | 11/2012 | Thillo et al. | |
| 2013/0063964 A1* | 3/2013 | Meir et al. | 362/555 |
| 2013/0096392 A1* | 4/2013 | Adams | 600/301 |
| 2013/0135272 A1* | 5/2013 | Park | 345/211 |
| 2013/0141505 A1* | 6/2013 | Ikeda et al. | 347/104 |
| 2013/0271775 A1* | 10/2013 | Chang | 358/1.9 |
| 2014/0036014 A1* | 2/2014 | Mozel et al. | 347/100 |

* cited by examiner

METHOD AND APPARATUS FOR AUTOMATED GENERATION OF A WHITE INK SEPARATION OUT OF CMYK DATA OR RGB PRINT DATA

BACKGROUND OF THE INVENTION

1. Technical Field

The invention relates generally to the field of printing and printing devices. More specifically, the invention relates to printing on devices that have the capability to use white ink as a printing color.

2. Description of the Related Art

Presently, to print on media whose color is other than white or near white, -a white ink separation is printed first. Options may include printing the white ink separation as a full tone layer (100%) followed by printing additional inks on top of the full tone layer or manually creating the white ink separation as a spot color separation in the job creation process.

The white layer may be generated automatically by performing a mathematical function of the process output colors CMYK. For instance, white may be created wherever any of C, M, Y, or K is unequal to zero. According to this process, a white background is created behind the printed area and the process leaves the unprinted area free of white. That is, in accordance with the approach of printing a white ink separation as a full tone layer, when it is desired to have a printout with white ink, then white is printed as a complete white layer, 100% white, that is effectively a complete coating of the substrate on which the image is to be printed. After printing 100% white on the substrate, CMYK inks are printed on top of the white layer to create the image. It should be appreciated that other inks such as red, orange, green, blue, silver, gold, etc., may print on top of the white later as well, e.g. depending on the type of the printing device.

The second approach includes creating an International Color Consortium (ICC) profile with five channels. For purposes of discussion herein, an ICC profile is a file or set of data that applies values to maintain color consistency from device to device. The International Color Consortium is the forum responsible for such printing standards. These five channels are C, M, Y, K, and white. An ICC profile with more than the process colors, CMYK, may be referred to as an N-color profile.

To create an ICC profile, a color profiling application may be required to create such type of multi-channel profile. Additionally it may also be necessary for a user to generate a particular set of charts and print and measure such charts to create the ICC profile. The process involves printing special color charts on the given media on the particular printer. Color patches on such printed charts are measured subsequently using a measuring device such as a spectrophotometer. There are many applications in the market that are capable of creating CMYK based ICC profiles, however only few are able to build an ICC profile that contains a white channel in addition to the other colors.

Further these approaches and other existing techniques may include creating a white ink layer or image based on empirical methods by in-situ measurements of the change in color depth with varying densities of white-ink for each of the possible CMYK combinations. Other methods may determine the white ink heuristically, e.g. depending on a set of if-then rules based on the combination of media color and the regions within the image.

SUMMARY OF THE INVENTION

Techniques are provided that include an algorithm and a computing device using such algorithm to compute a white ink separation channel from the CMYK or RGB data from a print pipeline as an input. This input originally corresponds to print data on a media with standard whiteness, e.g. standard whiteness corresponding to a diffuser used by the Comission Internationale de l'Eclairage (CIE) 1964 media whiteness formula. In an example implementation, the white ink channel computed by the computing device using such algorithm may be printed as a pre-coat on a colorimetrically different media which does not comply with definitions and formulae of CIE's whiteness and tint.

DETAILED DESCRIPTION OF THE INVENTION

Figure 1:
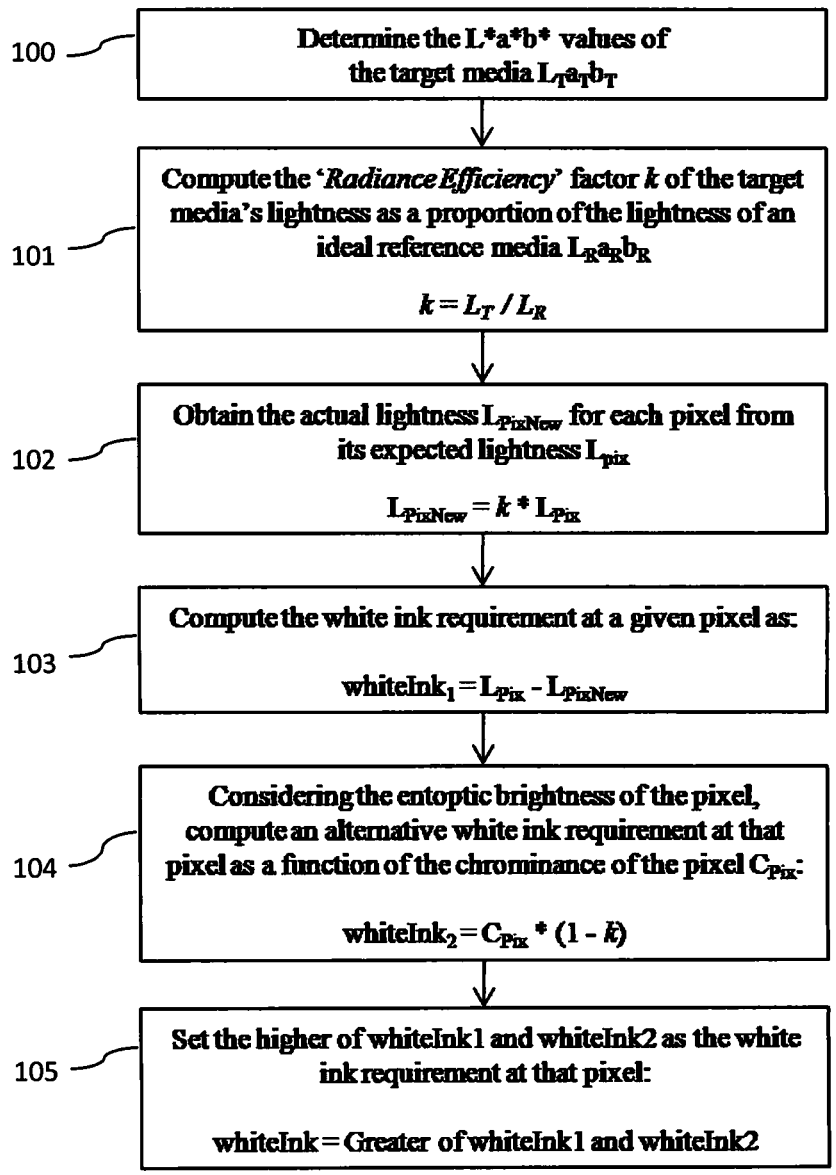
FIG. 1 is a state flow diagram of the approach of determining the amount of white ink to be printed for each pixel according to an embodiment.

Techniques are provided that include an algorithm and a computing device using such algorithm to compute a white ink separation channel from the CMYK or RGB data from a print pipeline as an input. This input originally corresponds to print data on a media with standard whiteness, e.g. standard whiteness corresponding to a diffuser used by the Comission Internationale de l'Eclairage (CIE) 1964 media whiteness formula. In an example implementation, the white ink channel computed by the computing device using such algorithm may be printed as a pre-coat on a colorimetrically different media which does not comply with definitions and formulae of CIE's whiteness and tint.

It should be appreciated that embodiments may encompass printing devices that have the ability to print white as an ink color including but not limited to presses, inkjet or toner printers, silk screening machines, machines for printing on t-shirts, printers for offset printing, ceramic printers, equipment for flexographic printing, rotogravure printing machines, etc. As well, it should be appreciated that in an embodiment, automatic white calculation may be performed as part of a combination ripping and render process.

According to an embodiment, a method and apparatus are provided for printing white ink as a printing color. An embodiment is based in part on the following phenomena of color perception and appearance in no particular order:

Heterochromatic brightness matching criteria of photometry; and

The significance of Helmholtz-Kohlrausch effect.

For purposes of discussion herein, heterochromatic brightness matching is a process by which the radiance of a test wavelength is measured against a test area that is adjusted in comparison to a reference area. The procedure is repeated for a plurality of test field wavelengths. The reciprocal of such measured radiances are plotted to create a relative luminance function. Further, for purposes of discussion herein, the Helmholtz-Kohlrausch effect is a particular phenomenon wherein saturation of a color's hue is perceived as part of the color's luminance.

It should be appreciated that the difference in the perceived colors printed with the reference CMYK on a standard white media compared to a non-standard media, such as one that is colorimetrically different, may be due primarily to the difference in the reflectance properties of the standard white media and the non-standard media. In an embodiment, Abney's effect and the proportionality law of heterochromatic brightness matching are assumed valid and enable a photopic match without any Purkinje shift. For purposes of discussion herein, Abney's effect is a hue shift of a color that is physiological in nature, e.g. perceived, rather than actual. The Abney effect is an effect that is present under the circumstances of the described environment and, thus, may be taken into account for correct computation of the white separation. Such assumptions are required for the provided algorithm, described in detail hereinbelow. It should be further appreciated that the assumptions describe perception of color by the human eye. For purposes of discussion herein, a Purkinje shift is a shift towards the blue end of the color spectrum due to lower light conditions.

In an embodiment, the assumptions of Abney's effect and the proportionality law of heterochromatic brightness matching enable computation of a factor, referred to herein as the radiance efficiency factor (k). Thus, k represents how the radiant power of the standard and non-standard media differs due to their corresponding differences in relative spectral distribution.

In an embodiment, white ink for a pixel is computed on the fly as a function of this radiance efficiency factor k and either:
  Lightness, wherein the lightness difference that is to be compensated by the white ink is considered; or
  Chrominance, wherein the Helmholtz-Kohlrausch effect by which the entoptic brightness increases with saturation or excitation purity is considered.

In an embodiment, a uniform color space, e.g. a perceptually uniform color space, may be used for the computation of appearance correlates, e.g. lightness and chrominance. In one embodiment, CIE 1976 L*a*b* (CIELAB) is used. CIELAB is a color space in which the lightness channel and each of the chrominance channels are de-correlated and that is also approximately uniform where the Euclidean property of color perception may be considered valid. It should be appreciated that other embodiments may use other color spaces that may include but are not limited to LAB, L*A*B*, K only, CMYKx, where x is a non-shite separated color, etc.

It should be appreciated that in an embodiment Abney's effect may be discounted or ignored for smaller color gamuts.

Transform

Embodiments herein may include generating a transform to compute a white ink separation channel from particular color data from a print pipeline as an input. For example, an embodiment may provide a CMYK to CMYKW transform. In an embodiment, such transform may use one spectral measurement of raw target media data and N spectral measurements of patches based on selected colors from source data to be printed. In another embodiment, a CMYK(n) raw data file, e.g. raster or vector, may be used as input and to generate a CMYK(n)W by a transform which may not require use of ICC profiles or which may use at most a ICC device link profile.

White Border

An embodiment is provided that generates a white border about all of or part of an object. As well, an embodiment provides such generation of the white border as an option. For example, white edges may be expanded by a specified number of pixels such that a white border is formed around the object. Such feature may be useful in the case of the need to create better readability or visibility of a dark object being printed on a dark background, e.g. providing "backlighting."

An Exemplary Stateflow

Following is a description of an exemplary stateflow for determining the amount of white ink to be printed in accordance with an embodiment. Such algorithm can be understood with reference to FIG. 1, as follows:

In an embodiment, at step 100, the L*a*b values of a target media ($L_T a_T b_T$) are determined, for example but not limited to by being measured using a spectrophotometer. The L*a*b values of the reference media ($L_R a_R b_R$) are summed to be (100,0,0) respectively. Thus, with the L*a*b values of the reference media and target media ($L_T a_T b_T$) known, the radiance efficiency factor, k, of the media is computed at step 101 as a ratio of $L_T$ and $L_R$. Such factor is used to account for a luminous efficiency of the target media as against that of the reference media. Because no color correction is required, the individual spectral luminous efficiency of the target media need not be considered for the chrominance component of the pixel. Following is the equation for computing radiance efficiency factor in the embodiment:

$$\text{Radiance efficiency factor } k = L_T / L_R$$

For purposes of discussion herein, for each pixel, the expected lightness $L_{Pix}$ is the lightness expected when the pixel is printed on the reference media. It should be appreciated that due to the radiance efficiency of the target media, such expected lightness may be sub-scaled accordingly and result in $L_{PixNew}$. Thus, in an embodiment, at step 102, the actual lightness of each pixel, $L_{PixNew}$, may be computed on the fly for each pixel using the following equation:

$$L_{PixNew} = k * L_{Pix}$$

At step 103, the difference between the $L_{PixNew}$ and $L_{Pix}$ is translated directly into the corresponding white ink amount required for the corresponding pixel. That is, the white ink requirement is computed at a given pixel as:

$$\text{whiteInk}_1 = L_{Pix} - L_{PixNew};$$

$$\text{or, equivalently, whiteInk}_1 = L_{Pix} * (1-k).$$

It should be appreciated that the computation of whiteInk$_1$ may not account for highly chromatic pixels with lesser lightness whose entoptic brightness may be considered substantially high. An example of such situation may include dark pixels but with high chroma. Such pixels increase entoptic brightness even when the measured lightness is low. In such case the Helmholtz-Kohlrausch effect may be used in the computation of white ink. Such situation being accounted for by addressing the Helmholtz-Kohlrausch effect is shown in step 104. That is, in an embodiment, considering the entopic brightness of a pixel, an alternative white ink requirement, whiteInk$_2$, is computed at the pixel as a function of the chrominance of the pixel $C_{Pix}$, as follows:

$$\text{whiteInk}_2 = C_{Pix} * (1-k).$$

In accordance with the embodiment, $C_{Pix}$ is the chrominance of the pixel computed a priori in CIELAB space. That is, $C_{Pix}$ is computed when converting the L*a*b* values in the LCh color space: $C_{Pix} = \text{sqrt}(\text{sqr}(a^*) + \text{sqr}(b^*))$.

Thus, using $C_{Pix}$ in place of $L_{Pix}$ and keeping in view that both of these values approximately scale equivalently, the above steps 102 and 103 are repeated where $C_{Pix}$ is the chrominance of the pixel computed a priori to compute whiteInk$_2$ as defined above. It should be appreciated that keeping in view that both $C_{Pix}$ and $L_{Pix}$ approximately scale equivalently is important due to the fact that it is desired to compute the minimum of whiteInk$_1$ and whiteInk$_2$, each of which is directly proportional to $L_{Pix}$ and $C_{Pix}$. Thus, if $L_{Pix}$ and $C_{Pix}$ would not be equivalently scaled, incorrect results may be created.

At step 105, the higher value of whiteInk$_1$ and whiteInk$_2$ is set as the white ink for the pixel.

In the embodiment, the above described algorithm is performed pixel by pixel in real time to create a white layer on the target media.

It should be appreciated that advantages of this above described approach over the approach of printing an entire 100% white layer include that white ink is used only when needed to create the desired color and is used only in an appropriate quantity. Thus, there is no need to print white blindly over the entire substrate area as in prior art approaches. Instead, embodiments herein just use white to create the image. Therefore the approach of embodiments herein saves a lot of ink and thus is a more cost effective printing method.

Some advantages of embodiments herein over the approach of creating an ICC profile with five channels include that such embodiments do not require the use of one of a few color profiling applications available in the market to generate the ICC profile. As well, even if such color profiling application is readily available, such color profiling application may be very expensive.

Further the approach of embodiments herein helps to increase the color gamut while saving printing ink or toner and maintaining or increasing the output quality. Further, embodiments herein may be used to save costs on printing substrates.

It has been found that some disadvantages of other approaches may include: high ink usage, small gamut on dark substrates, and lack of an algorithmic approach that can be employed across different combinations of image and media characteristics.

It should be appreciated that the algorithm can be stored as part of the printer driver, which is part of the piece of software that generates the print file.

An Example Machine Overview

Figure 2:
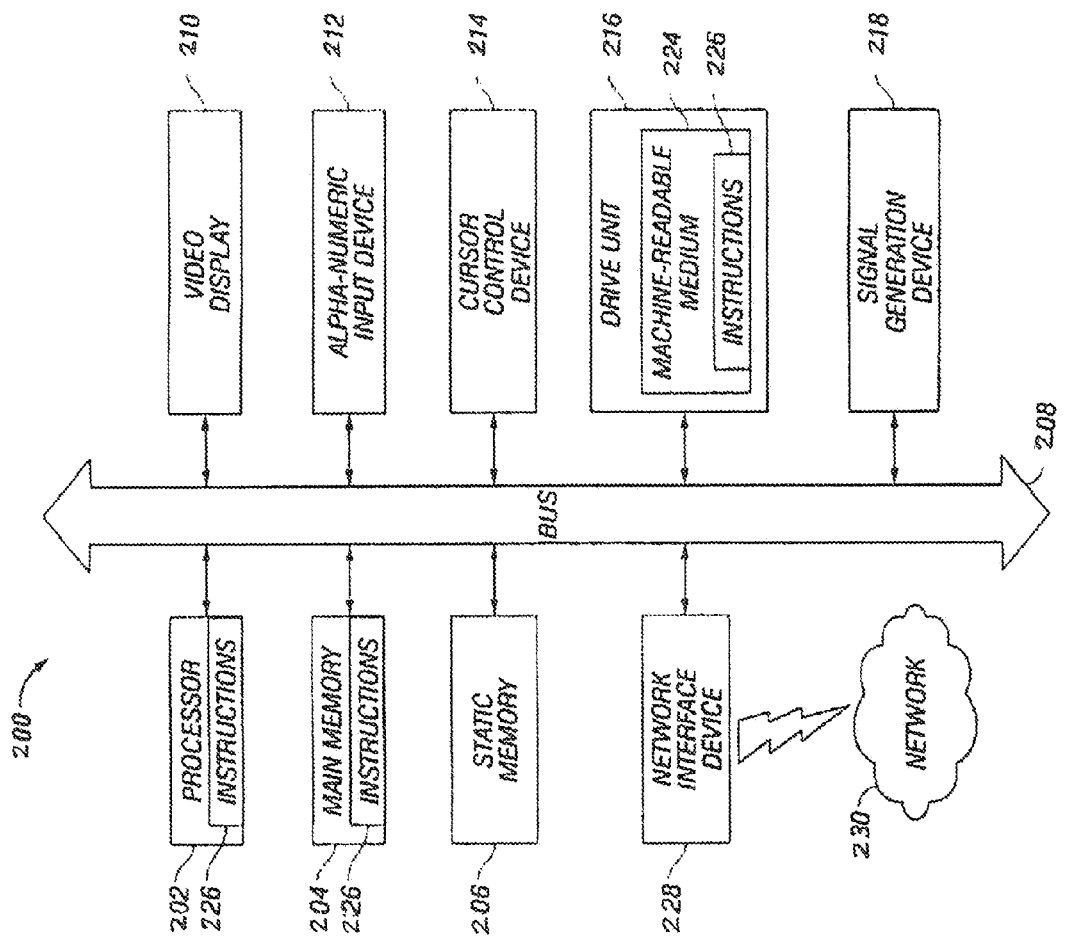
FIG. 2 is a block schematic diagram of a system in the exemplary form of a computer system according to an embodiment.

FIG. 2 is a block schematic diagram of a system in the exemplary form of a computer system 200 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 200 includes a processor 202, a main memory 204 and a static memory 206, which communicate with each other via a bus 208. The computer system 200 may further include a display unit 210, for example, a liquid crystal display (LCD) or a cathode ray tube (CRT). The computer system 200 also includes an alphanumeric input device 212, for example, a keyboard; a cursor control device 214, for example, a mouse; a disk drive unit 216, a signal generation device 218, for example, a speaker, and a network interface device 220.

The disk drive unit 216 includes a machine-readable medium 224 on which is stored a set of executable instructions, i.e. software, 226 embodying any one, or all, of the methodologies described herein below. The software 226 is also shown to reside, completely or at least partially, within the main memory 204 and/or within the processor 202. The software 226 may further be transmitted or received over a network 228, 230 by means of a network interface device 220.

In contrast to the system 200 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to begin a printing process on such internet-enabled or other network-enabled devices, servers, or clients. It further should be appreciated that one or more cloud computing embodiments include beginning a printing process using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for printing with a device capable of printing white ink as a printing color comprising:
    computing a radiance efficiency factor, k, that is the ratio of the lightness of a target media to the lightness of a reference media;
    for each pixel:
        computing, using k, an amount of white ink of a white ink separation channel from CMYK or RGB data from a print pipeline as an input; and
        when the lightness of the target media is different from the lightness of the reference media, printing using the white ink separation channel on the target media.

2. The method of claim 1, wherein the target media does not comply with definitions of whiteness and tint as provided by the CIE.

3. The method of claim 1, wherein computing the amount of white ink of a white ink separation channel is performed as part of a combination ripping and render process.

4. The method of claim 1, further comprising forming a white border around an object by expanding white edges of the object by a predetermined number of pixels.

5. The method of claim 1, wherein computing the amount of white ink of a white ink separation channel further comprises any of:
generating a CMYK to CMYKW transform; and
using a CMYK(n) raw data file input and CMYK(n)W output whose transform does not require use of an ICC profile or at most a ICC device link profile.

6. The method of claim 1, wherein the lightness of the reference media and target media are both between 0 and 100.

7. The method claim 1, wherein the step of computing the amount of white ink of a white ink separation channel further comprises:
determining the lightness expected for each pixel, $L_{Pix}$, if printed on the reference media; and
computing a first white ink value, $whiteInk_1$, for each pixel using the equation:

$$whiteInk_1 = L_{Pix} * (1-k).$$

8. The method of claim 7, wherein the step of printing using the white ink separation channel comprises:
printing for each pixel the corresponding $whiteInk_1$ value of white ink.

9. The method of claim 7, wherein the step of computing the amount of white ink of a white ink separation channel further comprises:
determining the chrominance expected for each pixel, $C_{Pix}$, if printed on the reference media;
computing a second white ink value, $whiteInk_2$, using the equation:

$$whiteInk_2 = C_{Pix} * (1-k); \text{ and}$$

selecting the amount of white ink to be used for each pixel as the higher amount of $whiteInk_1$ and $whiteInk_2$.

10. The method of claim 9, wherein the step of printing using the white ink separation channel comprises:
printing for each pixel the corresponding higher of $whiteInk_1$ and $whiteInk_2$ value of white ink.

11. A printing apparatus for printing with a white ink as a printing color comprising:
a processor configured to compute a radiance efficiency factor, k, that is the ratio of the lightness of a target media to the lightness of a reference media;
a processor configured to compute for each pixel and using k, an amount of white ink of a white ink separation channel from CMYK or RGB data from a print pipeline as an input; and
a printer or machine configured to print, for each pixel, when the lightness of the target media is different from the lightness of the reference media, using the white ink separation channel as a pre-coat on the target media.

12. The apparatus of claim 11, wherein the target media does not comply with definitions of whiteness and tint as provided by the CIE.

13. The apparatus of claim 11, wherein said amount of white ink of the white ink separation is computed as part of a combination ripping and render process.

14. The apparatus of claim 11, further configured form a white border around an object by expanding white edges of the object by a predetermined number of pixels.

15. The apparatus of claim 11, wherein to compute the amount of white ink of a white ink separation channel further comprises any of:
to generate a CMYK to CMYKW transform; and
to use a CMYK(n) raw data file input and CMYK(n)W output whose transform does not require use of an ICC profile or at most a ICC device link profile.

16. The apparatus of claim 11, wherein the lightness of the reference media and target media are both between 0 and 100.

17. The apparatus claim 11, wherein the processor configured to compute the amount of white ink is further configured to:
determine the lightness expected for each pixel, $L_{Pix}$, if printed on the reference media; and
compute a first white ink value, $whiteInk_1$, for each pixel using the equation:

$$whiteInk_1 = L_{Pix} * (1-k).$$

18. The apparatus of claim 17, wherein the printer or machine is further configured to:
print for each pixel the corresponding $whiteInk_1$ value of white ink.

19. The apparatus of claim 17, wherein the processor configured to compute the amount of white ink is further configured to:
determine the chrominance expected for each pixel, $C_{Pix}$, if printed on the reference media;
compute a second white ink value, $whiteInk_2$, using the equation:

$$whiteInk_2 = C_{Pix} * (1-k); \text{ and}$$

select the amount of white ink to be used for each pixel as the higher amount of $whiteInk_1$ and $whiteInk_2$.

20. The apparatus of claim 19, wherein the printer or machine are further configured to:
print for each pixel the corresponding higher of $whiteInk_1$ and $whiteInk_2$ value of white ink.

* * * * *